(12) United States Patent
Peng et al.

(10) Patent No.: US 12,143,155 B2
(45) Date of Patent: Nov. 12, 2024

(54) SUPER-SYMBOL SIGNALING IN OPTICAL COMMUNICATION SYSTEMS

(71) Applicant: Huawei Technologies Co., Ltd., Shenzhen (CN)

(72) Inventors: Wei-ren Peng, San Jose, CA (US); Yan Cui, Sunnyvale, CA (US); Yusheng Bai, Los Altos Hills, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 147 days.

(21) Appl. No.: 17/726,197

(22) Filed: Apr. 21, 2022

(65) Prior Publication Data

US 2022/0247496 A1 Aug. 4, 2022

Related U.S. Application Data

(63) Continuation of application No. PCT/US2019/057323, filed on Oct. 22, 2019.

(51) Int. Cl.
*H04B 10/516* (2013.01)
*H04B 10/54* (2013.01)
(Continued)

(52) U.S. Cl.
CPC ......... *H04B 10/541* (2013.01); *H04B 10/616* (2013.01); *H04L 1/0041* (2013.01); *H04L 1/0045* (2013.01); *H04L 1/0071* (2013.01)

(58) Field of Classification Search
CPC .................................................. H04B 10/541
See application file for complete search history.

(56) References Cited

U.S. PATENT DOCUMENTS 9,673,907 B1 6/2017 Vassilieva
10,530,490 B1 * 1/2020 Vassilieva .......... H04B 10/5161
(Continued)

FOREIGN PATENT DOCUMENTS

CN 108494719 A 9/2018

OTHER PUBLICATIONS

Amari, et al., "Introducing Enumerative Sphere Shaping for Optical Communication Systems with Short Blocklengths," arXiv: 1904.06601v4, [cs.IT], Sep. 19, 2019, pp. 1-10.
(Continued)

*Primary Examiner* — Shi K Li
(74) *Attorney, Agent, or Firm* — Conley Rose, P.C.

(57) ABSTRACT

An apparatus and method for transmitting information bits via an optical communication system, the apparatus including a distribution matcher (DM) configured to receive information bits and to generate shaped symbols relating to the information bits; a pre-deinterleaver (PDI) coupled to the DM and configured to apply a perturbation function q(n) to the shaped symbols to produce pre-deinterleaved symbols; an error reduction processor (ERP) coupled to the PDI and configured to receive computer instructions which, when executed, prompt the ERP to produce error reduction symbols from the pre-deinterleaved symbols, the error reduction symbols being perturbed from the pre-deinterleaved symbols by a perturbation function p(n), q(n) being an inverse of p(n); and a modulator coupled to the ERP and configured to convert the error reduction symbols into optical signals configured for transmission via an optical communication system.

21 Claims, 8 Drawing Sheets

(51) Int. Cl.
H04B 10/61 (2013.01)
H04L 1/00 (2006.01)

(56) References Cited

U.S. PATENT DOCUMENTS

| | | | | |
|---|---|---|---|---|
| 2010/0080571 | A1* | 4/2010 | Akiyama | G02F 1/0123 398/186 |
| 2016/0036533 | A1* | 2/2016 | Nakashima | H04B 10/50575 398/187 |

OTHER PUBLICATIONS

Buchali, et al., "Rate Adaptation and Reach Increase by Probabilistically Shaped 64-QAM: An Experimental Demonstration," Journal of Lightwave Technology, vol. 34, No. 7, Apr. 1, 2016, pp. 1599-1609.

Dar, et al., "On Shaping Gain in the Nonlinear Fiber-Optic Channel," 2014 IEEE International Symposium on Information Theory, 2794-2798.

Fehenberger, et al., "Analysis and Optimisation of Distribution Matching for the Nonlinear Fibre Channel," arXiv: 1907.02846v1, [eess.SP], Jul. 5, 2019, pp. 1-4.

Geller, "A Shaping Algorithm for Mitigating Inter-Channel Nonlinear Phase-Noise in Nonlinear Fiber Systems," Journal of Lightwave Technology, vol. 34, No. 16, Aug. 15, 2016, pp. 3884-3889.

Roberts, "Nonlinear Mitigation Enabling Next Generation High Speed Optical Transport Beyond 100G," M3J.1.pdf, OFC 2019, Optical Society of America 2019, 3 pages.

Schulte, et al., "Constant Composition Distribution Matching," IEEE Transactions on Information Theory, vol. 62, No. 1, Jan. 2016, pp. 430-434.

Schulte, et al., "Four Dimensional Probabilistic Shaping for Fiber-Optic Communication," SpM2F.5.pdf, Advanced Photonics Congress (IPR, Networks, Noma, PS, Sensors, SPPCom), Optical Society of America, 2017, 3 pages.

Sillekens, et al., "A Simple Nonlinearity-Tailored Probabilistic Shaping Distribution for Square QAM," Optical Society of America, OFC 2018, M3C.4.pdf, 3 pages.

Sorokina, "Ripple Distribution for Nonlinear Fiber-Optic Channels," Optics Express, vol. 25, No. 3, Feb. 6, 2017, pp. 2228-2238.

Steiner, et al., "Experimental Verification of Rate Flexibility and Probabilistic Shaping by 4D Signaling," M4E.3.pdf, OFC 2018, Optical Society of America, 3 pages.

Tehrani, et al., "A Novel Nonlinearity Tolerant Super-Gaussian Distribution for Probabilistically Shaped Modulation," 2018 European Conference on Optical Communication (ECOC), 3 pages.

Xu, et al., "Probabilistic Shaping QC-LDPC Coded Modulation Scheme for Optical Fiber Systems," Th11.4.pdf, 2018 Conference on Lasers and Electro-Optics Pacific Rim (Cleo-PR), OSA, Jul. 29, 2018 (Jul. 29, 2018), p. 12, KP033542130 [retrieved on Apr. 25, 2019].

Yankov, "Temporal Probabilistic Shaping for Mitigation of Nonlinearities in Optical Fiber Systems," Journal of Lightwave Technology, vol. 35, No. 10, May 15, 2017, pp. 1803-1810.

* cited by examiner

SUPER-SYMBOL SIGNALING IN OPTICAL COMMUNICATION SYSTEMS

CROSS-REFERENCE TO RELATED APPLICATIONS

This patent application is a continuation of International Application No. PCT/US2019/057323, filed Oct. 22, 2019, by Wei-ren Peng, et al., and titled "Super-Symbol Signaling in Optical Communication Systems," the teachings and disclosure of which are hereby incorporated in their entirety by reference thereto.

TECHNICAL FIELD

The present application relates to optical communication systems and, in particular, to super-symbol signaling in dual-polarized coherent optical probabilistically-shaped (PS) systems.

BACKGROUND

Shaping for optical communications with paired distribution matcher (DM) and inverse DM (invDM) include shaping methods that attempt to provide overall linear and nonlinear gain. Some such shaping may utilize a memory of prior symbols, e.g., multi-dimensional shaping, in an attempt to reduce cross-phase modulation (XPM) distortion. Other shaping systems may use modified DM/invDM functions with specific output patterns to improve nonlinear transmission, however, such systems require more complex DM and invDM designs.

Still other systems may use shaping methods with different symbol distribution, such as super-Gaussian or ripple distribution. And other systems may use two dimensional (2D) and four dimensional (4D) shaping in an attempt to reduce nonlinear phase noise in short reach or dispersion-managed links. In some such systems, a 2D real and imaginary (I&Q) DM (shell mapping) method and finite length of DM may be used for single-span transmission. Some systems may use short-block length DM.

SUMMARY

A first aspect relates to an optical transmitter that includes a distribution matcher (DM) configured to receive information bits and to generate shaped symbols relating to the information bits; a pre-deinterleaver (PDI) coupled to the DM and configured to apply a perturbation function q(n) to the shaped symbols to produce pre-deinterleaved symbols; an error reduction processor (ERP) coupled to the PDI and configured to receive computer instructions which, when executed, prompt the ERP to produce error reduction symbols from the pre-deinterleaved symbols, the error reduction symbols being perturbed from the pre-deinterleaved symbols by a perturbation function p(n), q(n) being an inverse of p(n); and a modulator coupled to the ERP and configured to convert the error reduction symbols into optical signals configured for transmission via an optical communication system.

In a first implementation form of the optical transmitter according to the first aspect as such, the ERP includes a forward error correction (FEC) processor coupled to the PDI and configured to receive computer instructions which, when executed, prompt the FEC processor to produce configured to receive computer instructions which, when executed, prompt the FEC processor to produce FEC codewords from the pre-deinterleaved symbols; and an interleaver coupled to the FEC processor and configured to permute the FEC codewords to produce the error reduction symbols.

In a second implementation form of the optical transmitter according to the first aspect as such or any preceding implementation form of the first aspect, the optical transmitter further incudes a tributary distributor coupled to the ERP and configured to distribute the error reduction symbols to a plurality of tributaries that are sent to the modulator, wherein the DM produces a plurality of output blocks comprising the shaped symbols and each output block occupies simultaneous consecutive symbol slots in each of the tributaries.

In a third implementation form of the optical transmitter according to the first aspect as such or any preceding implementation form of the first aspect, the modulator is a Quadrature Amplitude Modulation (QAM) modulator.

In a fourth implementation form of the optical transmitter according to the first aspect as such or either of the first or second implementation forms of the first aspect, the modulator is a single-channel QAM modulator configured to transmit a plurality of subcarriers.

In a fifth implementation form of the optical transmitter according to the first aspect as such or any preceding implementation form of the first aspect, the optical communication system comprises an optical fiber.

A second aspect relates to an optical receiver that includes a detector configured to convert optical signals received from an optical communication system into received error reduction symbols; a received error reduction processor (RERP) coupled to the detector and configured to receive computer instructions which, when executed, prompt the RERP to produce received pre-deinterleaved symbols from the received error reduction symbols; a post-interleaver (PI) coupled to the RERP and configured to apply a perturbation function q'(n) to the received pre-deinterleaved symbols to produce received shaped symbols, where the received error reduction symbols are based on shaped symbols perturbed by a perturbation function q(n) and the perturbation function q'(n) is an inverse of the perturbation function q(n); and an inverse distribution matcher (invDM) coupled to the PI and configured to generate received information bits from the received shaped symbols.

In a first implementation form of the optical receiver according to the second aspect as such, the RERP includes a de-interleaver coupled to the detector and configured to produce received forward error correction (FEC) codewords from the received error reduction symbols; and an FEC decoder coupled to the de-interleaver and configured to produce the pre-deinterleaved symbols from the received FEC codewords.

In a second implementation form of the optical receiver according to the second aspect as such or any preceding implementation form of the second aspect, the detector is a Quadrature Amplitude Modulation (QAM) detector.

In a third implementation form of the optical receiver according to the second aspect as such or the first implementation form of the second aspect, the detector is a single-channel QAM detector configured to detect a plurality of subcarriers.

In a fourth implementation form of the optical receiver according to the second aspect as such or any preceding implementation form of the second aspect, the optical communication system comprises an optical fiber.

A third aspect relates to a method for transmitting information bits via an optical communication system, the method including generating by a distribution matcher (DM) shaped symbols relating to received information bits; applying a perturbation function q(n) to the shaped symbols to produce pre-deinterleaved symbols; producing error reduction symbols from the pre-deinterleaved symbols, the error reduction symbols being perturbed from the pre-deinterleaved symbols by a perturbation function p(n), q(n) being an inverse of p(n); and converting by a modulator the error reduction symbols into optical signals configured for transmission via an optical communication system.

In a first implementation form of the method according to the third aspect as such, producing error reduction symbols from the pre-deinterleaved symbols includes producing by a forward error correction (FEC) processor FEC codewords from the pre-deinterleaved symbols; and permuting by an interleaver the FEC codewords to produce the error reduction symbols.

In a second implementation form of the method according to the third aspect as such or any preceding implementation form of the third aspect, converting the error reduction symbols into optical signals comprises converting the error reduction symbols into Quadrature Amplitude Modulation (QAM) optical signals.

In a third implementation form of the method according to the third aspect as such or the first implementation form of the third aspect, converting the error reduction symbols into optical signals comprises converting the error reduction symbols into single-channel QAM optical signals comprising a plurality of subcarriers.

In a fourth implementation form of the method according to the third aspect as such or any preceding implementation form of the third aspect, the optical signals are configured for transmission via optical fiber.

A fourth aspect relates to a method for receiving information bits via an optical communication system, the method including converting by a detector optical signals received from an optical communication system into received error reduction symbols; producing received pre-deinterleaved symbols from the received error reduction symbols; applying a perturbation function q'(n) to the received pre-deinterleaved symbols to produce received shaped symbols, where the received error reduction symbols are based on shaped symbols perturbed by a perturbation function q(n) and the perturbation function q'(n) is an inverse of the perturbation function q(n); and generating by an inverse distribution matcher received information bits from the received shaped symbols.

In a first implementation form of the method according to the fourth aspect as such, producing received pre-deinterleaved symbols from the received error reduction symbols includes producing by a de-interleaver received forward error correction (FEC) codewords from the received error reduction symbols; and producing by an FEC decoder the pre-deinterleaved symbols from the received FEC codewords.

In a second implementation form of the method according to the fourth aspect as such or any preceding implementation form of the fourth aspect, converting optical signals received from an optical communication system into received error reduction symbols comprises converting the optical signals from Quadrature Amplitude Modulation (QAM) optical signals into the received error reduction symbols.

In a third implementation form of the method according to the fourth aspect as such or the first implementation form of the fourth aspect, converting optical signals received from an optical communication system into received error reduction symbols comprises converting the optical signals from two-subcarrier single-channel QAM optical signals into the received error reduction symbols.

In a fourth implementation form of the method according to the fourth aspect as such or any preceding implementation form of the fourth aspect, the method further includes receiving the optical signals via an optical fiber.

A fifth aspect relates to an optical communication transceiver including the optical transmitter according to the first aspect as such or any preceding implementation form of the first aspect; and the optical receiver according to the second aspect as such or any preceding implementation form of the second aspect.

A sixth aspect relates to an optical communications device comprising electrical input/output means, optical means, a data storage means, and a processing means, the optical communications device specially configured to perform the method according to the third aspect as such or any preceding implementation form of the third aspect, or the method according to the fourth aspect as such or any preceding implementation form of the fourth aspect.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1A:
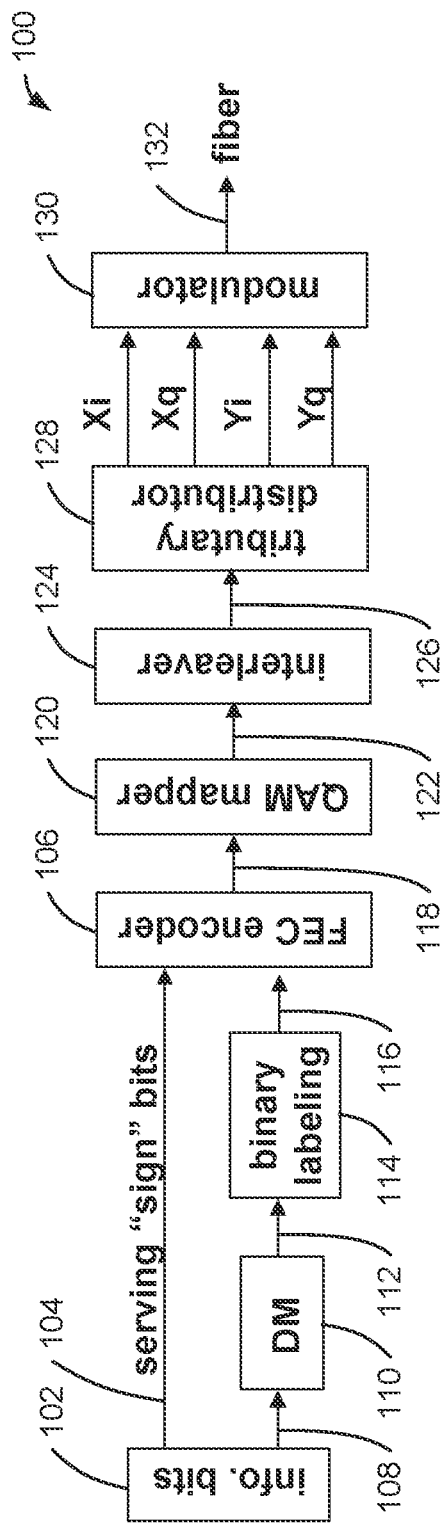
FIG. 1A is a block diagram of a single channel PS optical communication transmitter.

FIG. 1A is a block diagram of a single channel PS optical communication transmitter 100. The transmitter 100 receives a block 102 of information bits. Some bits 104 of the block 102 are sent directly to a forward error-correction (FEC) encoder 106 to serve as sign bits of shaped symbols input to the FEC encoder 106. The remaining bits 108 of the block 102 are input to a DM 110 for conversion into blocks of shaped pulse-amplitude modulated (PAM) symbols 112. A binary labeling function 114 converts the shaped symbols 112 to binary labeled bits 116 for input to the FEC encoder 106. In one example, the shaped symbols 112 may have an alphabet such as {1, 3, 5, 7} and are converted into binary labeled bits 116 such as {00, 01, 11, 10} by the binary labeling function 114.

The FEC encoder 106 generates FEC codewords 118 from the binary labeled bits 116, and the FEC codewords 118 are input to a quadrature amplitude modulation (QAM) mapper 120, which converts the FEC codewords 118 into QAM symbols 122. An interleaver 124 randomizes the QAM symbols 122 into interleaved symbols 126 for transmission. In some PS transmitters, the interleaver 124 may be a bit-level interleaver that precedes the QAM mapper 120.

The FEC encoder 106 and the interleaver 124 are included in the transmitter 100 to reduce errors in transmission of the block 102 of information bits. Thus the term error reduction processor may be used to refer to the interleaver 124 or collectively to the FEC encoder 106 and the interleaver 124. As such, the interleaved symbols 126 produced by the interleaver 124 may be referred to as error reduction symbols.

A tributary distributor 128 distributes the interleaved symbols 126 into tributaries Xi, Xq, Yi, and Yq. The real and imaginary parts (I&Q) of polarizations X and Y are input to a single channel modulator 130 to produce an optical signal for transmission on an optical communication link 132, such as an optical fiber.

Figure 1B:
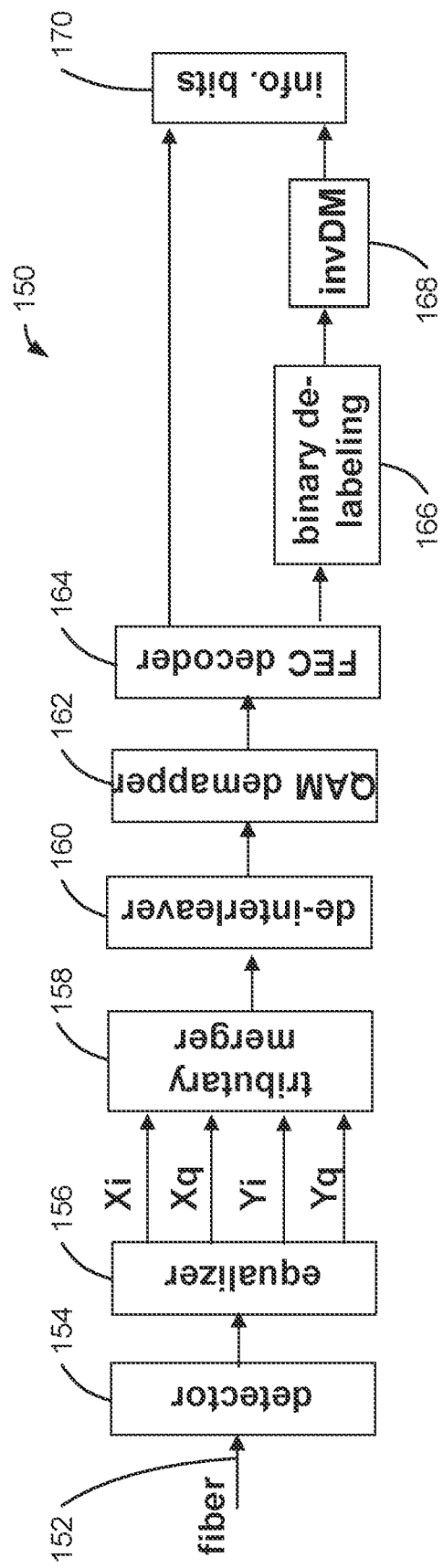
FIG. 1B is a block diagram of a single channel PS optical communication receiver.

FIG. 1B is a block diagram of a single channel PS optical communication receiver 150. The receiver 150 receives an optical signal via an optical link 152, such as an optical fiber. A detector 154 converts the optical signal to a received electrical signal and an equalizer 156 equalizes the received electrical signal into tributary signals Xi, Xq, Yi, and Yq. A tributary merger 158 produces interleaved symbols from the tributary signals Xi, Xq, Yi, and Yq. A de-interleaver 160 receives the interleaved symbols from the tributary merger 158 and produces QAM symbols that are demapped by a QAM demapper 162 to produce FEC codewords, which are decoded by an FEC decoder 164 into sign bits and binary labeled bits. A binary de-labeling function 166 receives the binary labeled bits and converts them into PAM symbols, which are sent to an inverse DM (invDM) 168 to restore some of the transmitted bits. The restored bits from the invDM 168 are combined with the sign bits decoded by the FEC decoder 164 to produce received information bits 170.

Figure 2:
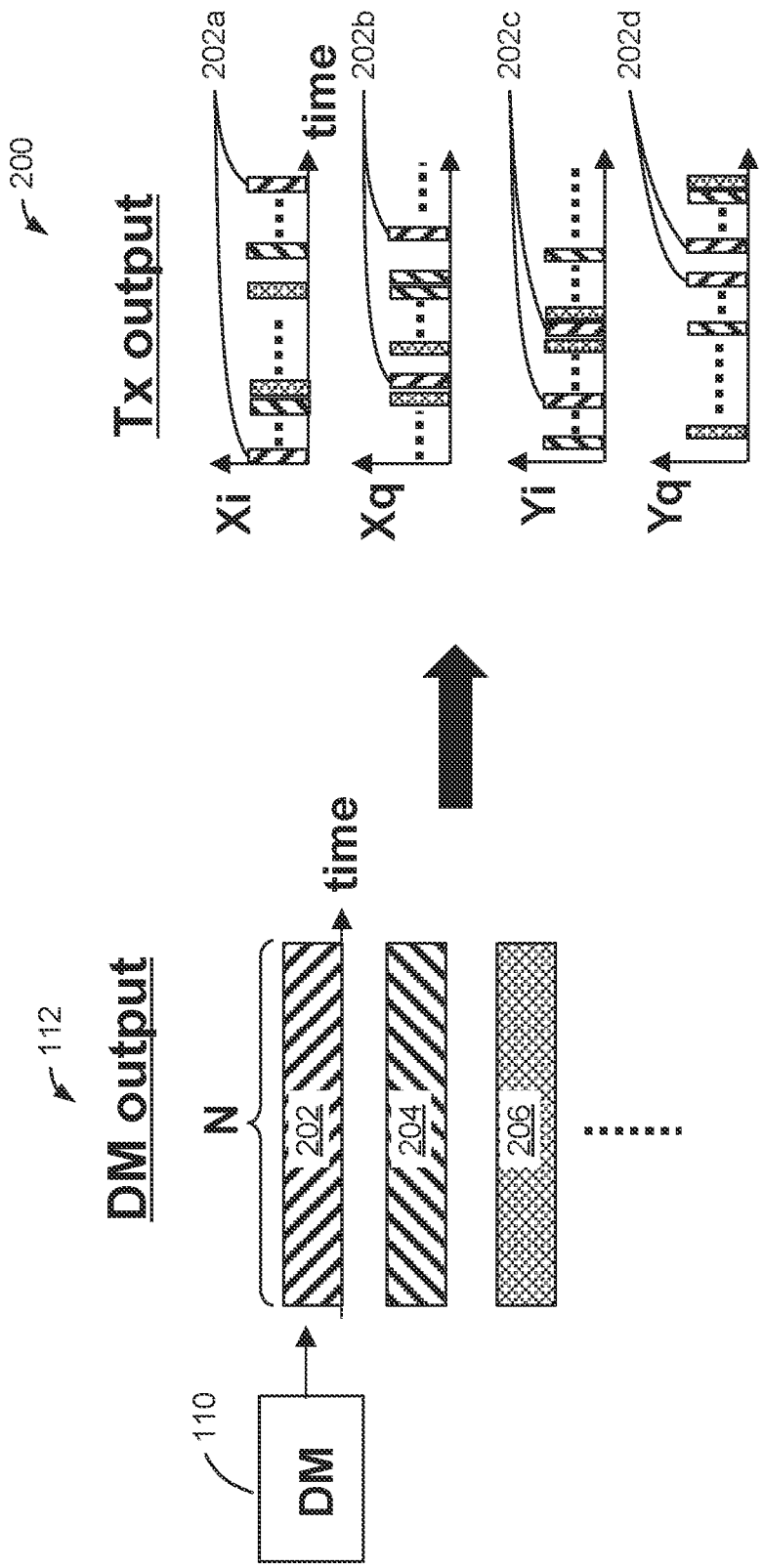
FIG. 2 is a timing diagram illustrating a representative transmitter output of the transmitter of FIG. 1A.

FIG. 2 is a timing diagram illustrating a representative transmitter output 200 of the transmitter 100 of FIG. 1A. As described with reference to FIG. 1A, the DM 110 converts information bits 108 into blocks 202, 204, and 206 of shaped PAM symbols 112. By the actions of the interleaver 124 (combined, in some systems, with actions of the FEC encoder 106), the blocks 202, 204, and 206 are partitioned onto the tributaries Xi, Xq, Yi, and Yq and distributed over time, as shown in the transmitter output 200. For example, the block 202 is partitioned and distributed into sub-blocks 202a, 202b, 202c, and 202d.

Figure 3A:
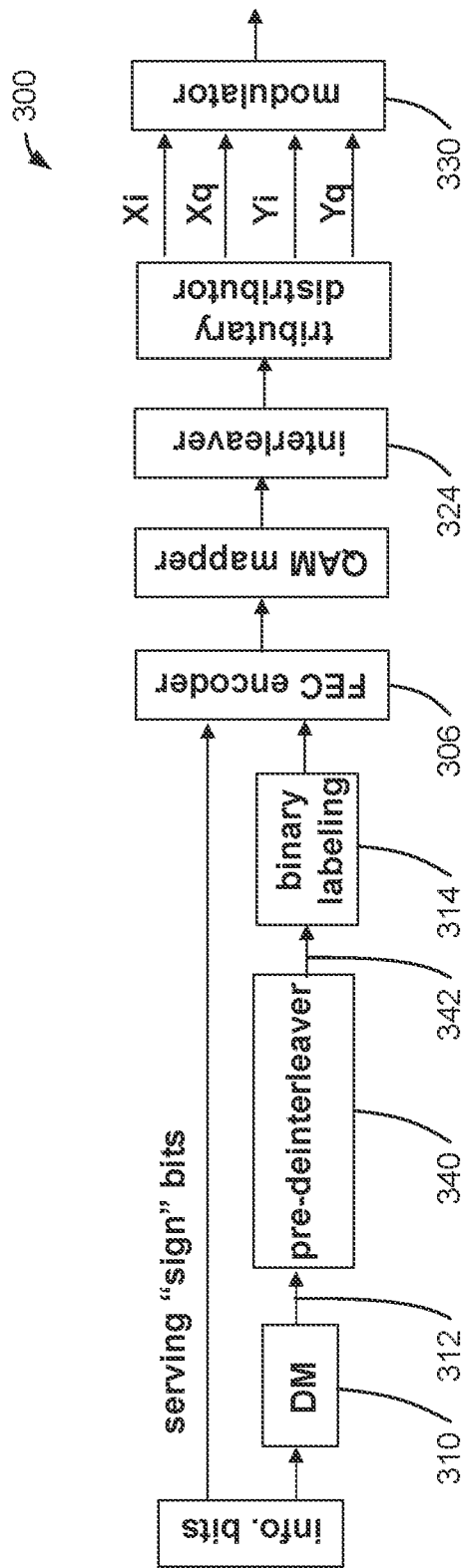
FIG. 3A is a block diagram of a single channel PS optical communication transmitter according to an embodiment of the disclosure.

FIG. 3A is a block diagram of a single channel PS optical communication transmitter 300 according to the disclosure. Many elements of the transmitter 300 are similar to the elements of the transmitter 100 described with reference to FIG. 1A, however the transmitter 300 interposes a pre-deinterleaver 340 between a DM 310 and a binary labeling function 314. The pre-deinterleaver 340 receives blocks of shaped PAM symbols 312 from the DM 310 and generates pre-deinterleaved symbols 342, which are then converted into binary labeled bits by the binary labeling function 314, as described with reference to FIG. 1A.

As described with reference to FIG. 2, the actions of an interleaver 324 (as well as, in some systems according to the disclosure, actions of a FEC encoder 306), perturb the blocks of shaped PAM symbols 312 generated by the DM 310. Such perturbation may be represented by a perturbation function p(n), where n is an integer representing an index of input symbols and p(n) is an integer representing indices of the perturbed symbols. In one simplified example, p(n=1: 4)=[4, 1, 3, 2] indicates that four input symbols are re-ordered to $4^{th}$, $1^{st}$, $3^{rd}$, $2^{nd}$ symbols in the output sequence.

In the transmitter 300, the pre-deinterleaver 340 applies a perturbation function q(n) that is an inverse of p(n): i.e., q(n=1:4)=[2, 4, 3, 1]. In this way, symbols {1, 2, 3, 4} are perturbed by the pre-deinterleaver 340 to {2, 4, 3, 1}, and are then perturbed by the interleaver 324 (and the FEC encoder 306) to {1, 2, 3, 4}.

Figure 3B:
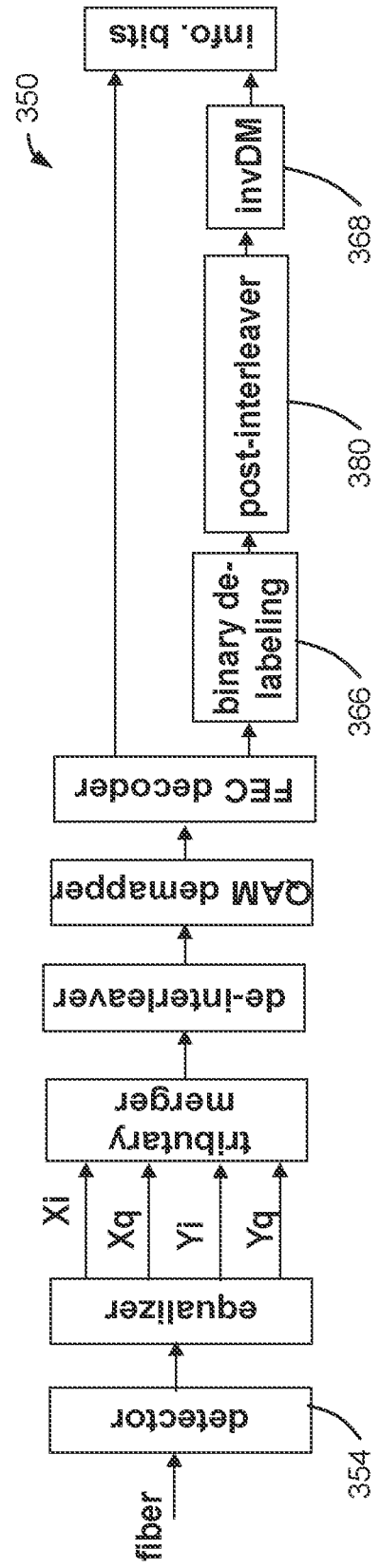
FIG. 3B is a block diagram of a single channel PS optical communication receiver according to an embodiment of the disclosure.

FIG. 3B is a block diagram of a single channel PS optical communication receiver 350 according to the disclosure. As with the transmitter 300 discussed with reference to FIG. 3A, many elements of the receiver 350 are similar to the elements of the receiver 150 described with reference to FIG. 1B, however the receiver 350 interposes a post-interleaver 380 between a binary de-labeling function 366 and an invDM 368. To restore the blocks of shaped PAM symbols 312 transmitted by the transmitter 300, the post-interleaver 380 applies an perturbation function q'(n) that is an inverse function of the perturbation function q(n) applied by the pre-deinterleaver 340 described with reference to FIG. 3A.

In some embodiments, the single channel PS optical communication transmitter 300 and the single channel PS optical communication receiver 350 are implemented together in a single channel PS optical communication transceiver.

Figure 4A:
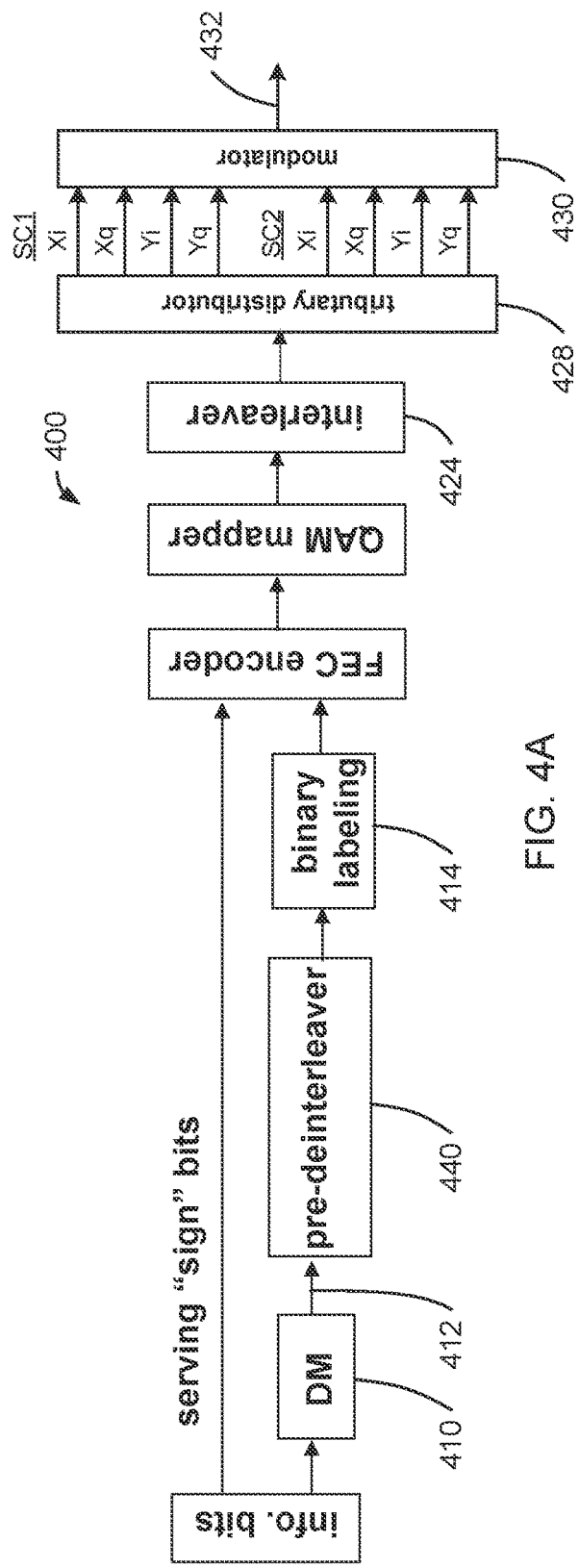
FIG. 4A is a block diagram of a two-subcarrier multiplexing PS optical communication transmitter according to an embodiment of the disclosure.

FIG. 4A is a block diagram of a two-subcarrier multiplexing PS optical communication transmitter 400 according to the disclosure. As in the single channel PS optical communication transmitter 300 described with reference to FIG. 3A, a pre-deinterleaver 440 is interposed between a DM 410 (from which it receives blocks of shaped PAM symbols 412) and a binary labeling function 414. Additionally, a two-subcarrier tributary distributor 428 distributes interleaved symbols received from an interleaver 424 into respective tributaries Xi, Xq, Yi, and Yq for two subcarriers SC1 and SC2. The tributaries of SC1 and SC2 form an input to a multiplexing modulator 430. The multiplexing modulator 430 upconverts the tributaries Xi, Xq, Yi, and Yq of the subcarrier SC2 before producing an optical signal for transmission on an optical communication link 432, such as an optical fiber. In other embodiments, circuitry outside the multiplexing modulator 430 upconverts the tributaries of the subcarrier SC2.

Figure 4B:
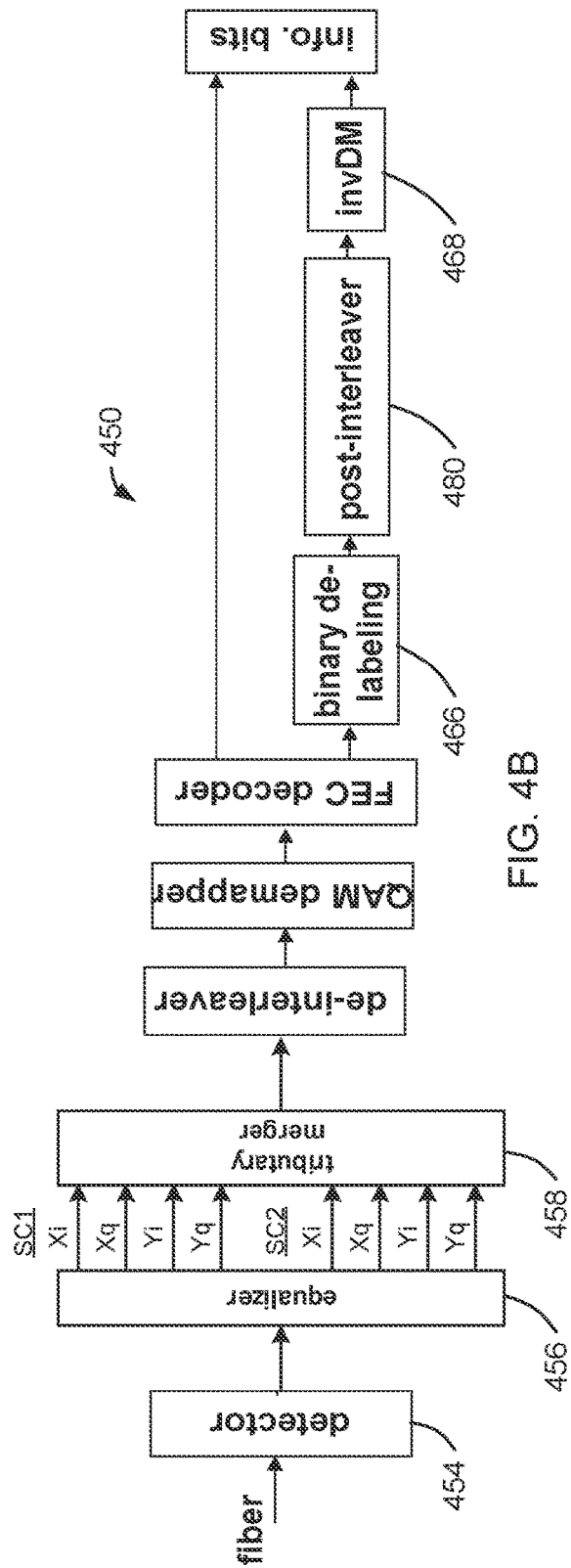
FIG. 4B is a block diagram of a two-subcarrier multiplexing PS optical communication receiver according to and embodiment of the disclosure.

FIG. 4B is a block diagram of a two-subcarrier multiplexing PS optical communication receiver 450 according to the disclosure. As in the single channel PS optical communication receiver 350 described with reference to FIG. 3B, a post-interleaver 480 that applies the inverse perturbation function q'(n) is interposed between a binary de-labeling function 466 and an invDM 468. Additionally, a multiplexing equalizer 456 equalizes a received electrical signal into respective tributary signals Xi, Xq, Yi, and Yq for subcarriers SC1 and SC2 and downconverts the tributaries Xi, Xq, Yi, and Yq of the subcarrier SC2. A two-subcarrier tributary merger 458 receives the tributary signals Xi, Xq, Yi, and Yq of subcarriers SC1 and SC1 from the multiplexing equalizer 456 and produces interleaved symbols.

In some embodiments, the two-subcarrier multiplexing PS optical communication transmitter 400 and the two-subcarrier multiplexing PS optical communication receiver 450 are implemented together in a two-subcarrier multiplexing PS optical communication transceiver. While FIG. 4A discloses a PS optical communication transmitter having a multiplexing modulator configured to transmit two subcarriers and FIG. 4B discloses a multiplexing PS optical communication receiver having a detector configured to detect two subcarriers, in other embodiments a transmitter according to the disclosure may include a modulator configured to transmit three or more subcarriers and a receiver according to the disclosure may include a detector configured to detect three or more subcarriers.

Figure 5:
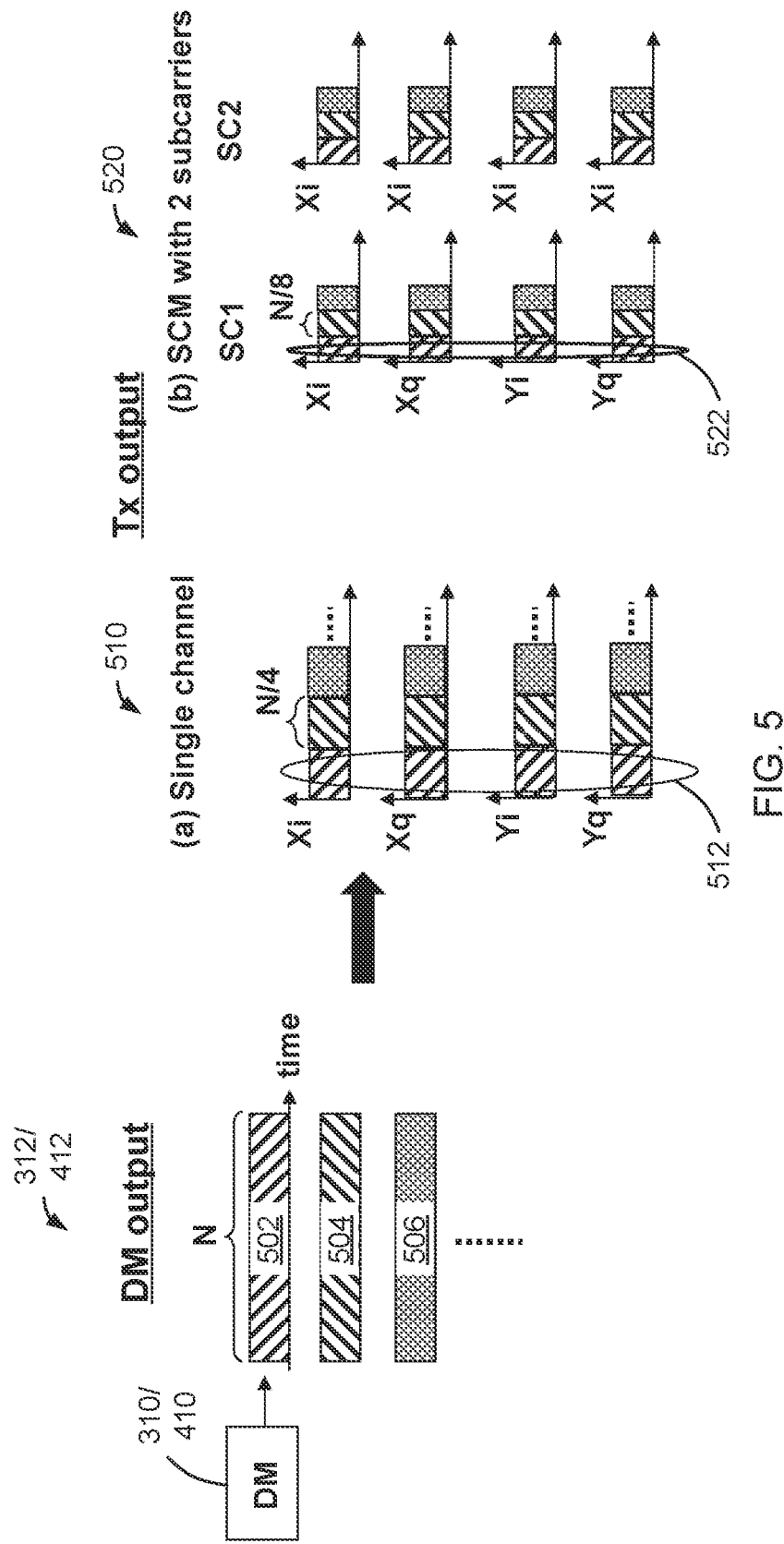
FIG. 5 is a timing diagram illustrating representative transmitter outputs of the transmitters of FIGS. 3A and 4A.

FIG. 5 is a timing diagram illustrating representative transmitter outputs 510 and 520, respectively, of the transmitters 300 and 400 of FIGS. 3A and 4A. As described with reference to FIGS. 3A and 4A, the DMs 310 and 410 generate blocks 502, 504, and 506 of shaped PAM symbols 312 and 412, respectively. By operation of the pre-deinterleaver 340, the block 502 forms a super-symbol 512 in the transmitter output 510. Similarly, by operation of the pre-deinterleaver 440, the block 502 forms a super-symbol 522 in the transmitter output 520. The super-symbols 512 and 522 occupy simultaneous consecutive symbol slots in each of the tributaries of their respective transmitter outputs 510 and 520.

The transmission of such super-symbols 512 and 522 mitigates fiber nonlinearity distortion. Since each DM block 502, 504, and 506 has a similar power level, the super-symbols of the disclosure provide a constant average across the transmitted super-symbols 512 and 522, which reduces accumulated cross-phase modulation (XPM) distortions in the optical communication link outputs of the transmitters 300 and 400. The super-symbols of the disclosure also provide higher optical signal to noise ratio (OSNR) margin to bit error rate (BER) at a higher launch power in both dispersion-unmanaged and dispersion-compensated optical links. Pre-deinterleavers and post-interleavers according to the disclosure may be designed to work with all kinds of DM and inverse DM algorithms, as well as with all modulation QAM orders.

The modulators 330 and 430 of the transmitters 300 and 400, respectively, and the detectors 354 and 454 of the receivers 350 and 450, respectively, are electrical-optical devices that convert electrical signals to/from optical signals.

Figure 6:
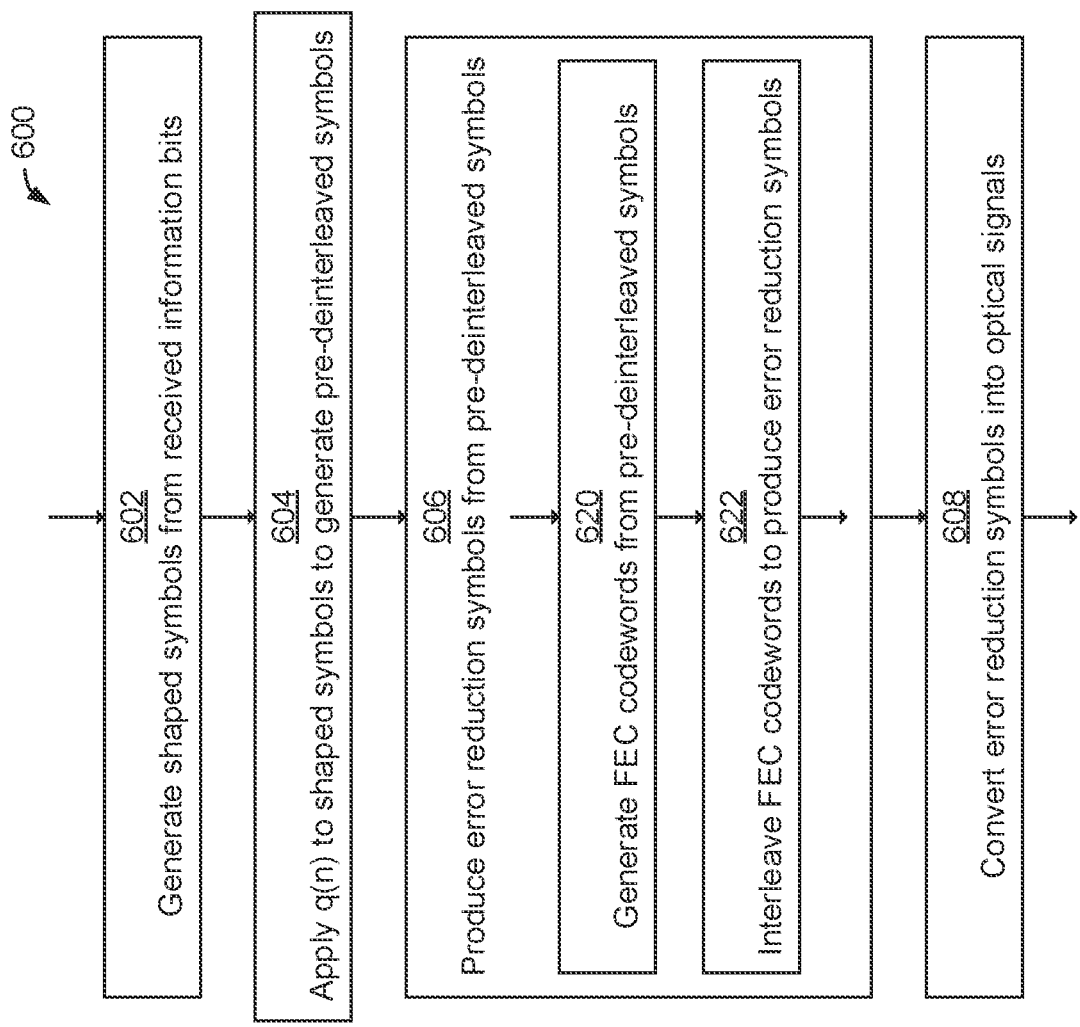
FIG. 6 is a flow chart of a method according to an embodiment of the disclosure for transmitting information bits via an optical communication system.

FIG. 6 is a flow chart of a method 600 according to the disclosure for transmitting information bits via an optical communication system. The method 600 may be performed by the single channel PS optical communication transmitter 300 described with reference to FIG. 3A or the two-subcarrier multiplexing PS optical communication transmitter 400 described with reference to FIG. 4A. In step 602, a DM converts received information bits into blocks of shaped PAM symbols. In step 604, a pre-deinterleaver applies a perturbation function q(n) to the blocks of shaped PAM symbols to generate pre-deinterleaved symbols.

In step 606, an error reduction processor produces error reduction symbols from pre-deinterleaved symbols. Step 606 includes, in step 620, an FEC encoder generates FEC codewords 118 from the pre-deinterleaved symbols and, in step 622, an interleaver randomizing the FEC codewords into interleaved symbols to produce the error reduction symbols. Finally, in step 608, a modulator converts the error reduction symbols into optical signals for transmission on an optical communication link, such as an optical fiber.

Figure 7:
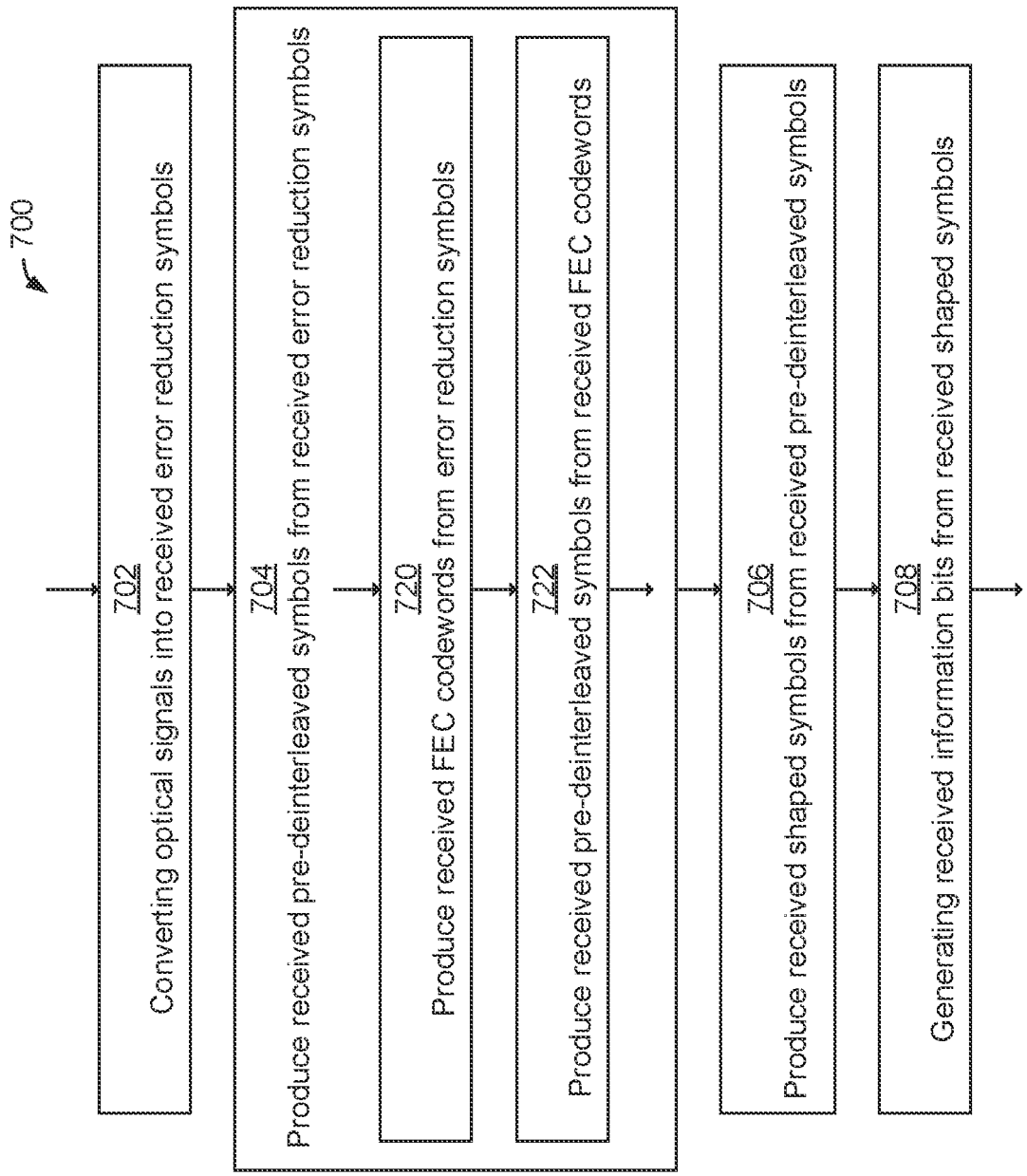
FIG. 7 is a flow chart of a method according to an embodiment of the disclosure for receiving information bits via an optical communication system.

FIG. 7 is a flow chart of a method 700 according to the disclosure for receiving information bits via an optical communication system. The method 700 may be performed by the single channel PS optical communication receiver 350 described with reference to FIG. 3B or the two-subcarrier multiplexing PS optical communication receiver 450 described with reference to FIG. 4B. In step 702, a detector converts optical signals received from an optical communication system into received error reduction symbols. In step 704, a received error reduction processor produces received pre-deinterleaved symbols from the received error reduction symbols. Step 704 includes, in step 720, a de-interleaver producing received FEC codewords from the received error reduction symbols and, in step 722, an FEC decoder producing the pre-deinterleaved symbols from the received FEC codewords.

In step 706, a post-interleaver applies a perturbation function q'(n) to the received pre-deinterleaved symbols to produce received shaped symbols. Finally, in step 708, an inverse distribution matcher generates received information bits from the received shaped symbols.

The following abbreviations are used herein:
ASIC: application-specific integrated circuit
CPU: central processing unit
DSP: digital signal processor
EO: electrical-to-optical
FPGA: field-programmable gate array
OE: optical-to-electrical
RAM: random-access memory
RF: radio frequency
ROM: read-only memory
SRAM: static RAM
TCAM: ternary content-addressable memory.

Figure 8:
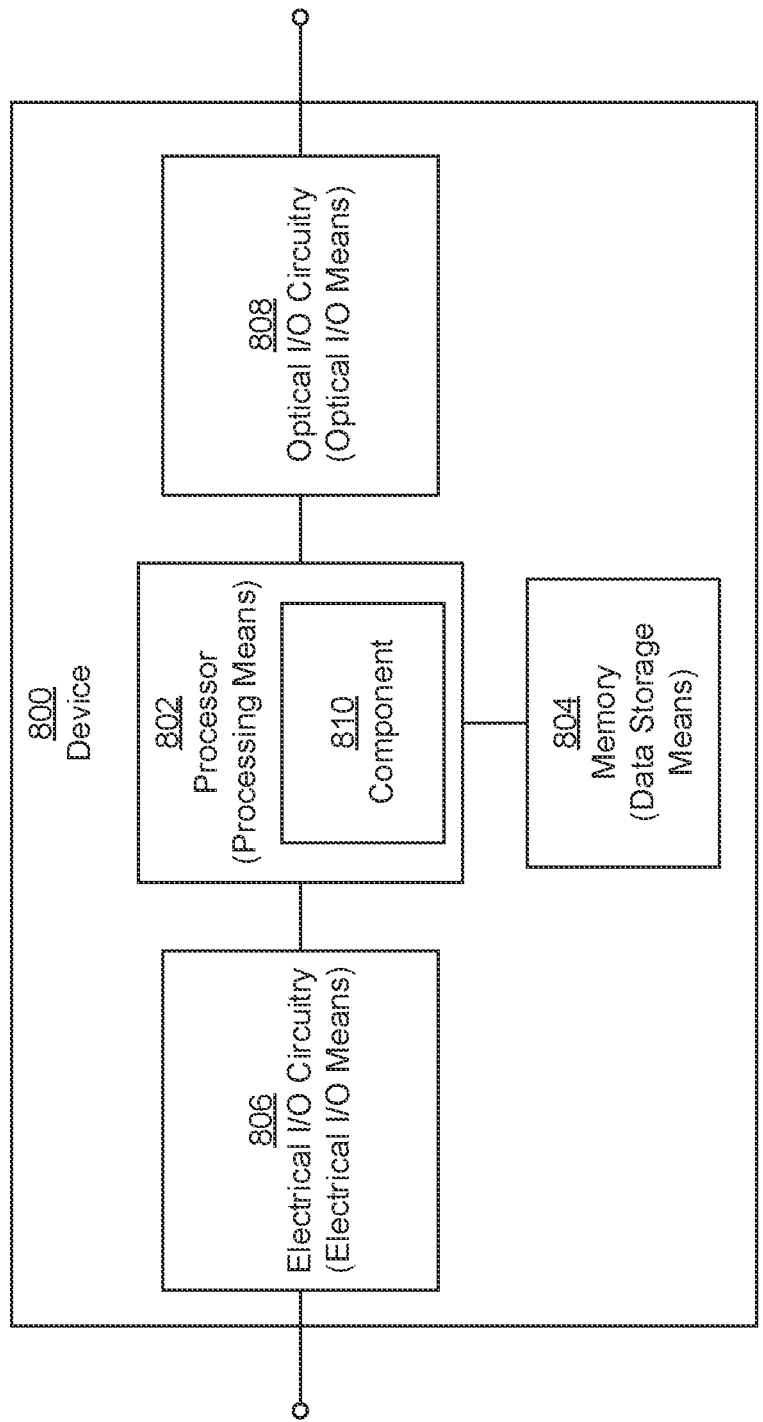
FIG. 8 is a schematic diagram of an optical communications device according to the disclosure.

FIG. 8 is a schematic diagram of an optical communications device 800 according to the disclosure. The device 800 may implement any of the disclosed embodiments. In various embodiments, the device 800 implements the transmitter 300, the receiver 350, a transceiver comprising both the transmitter 300 and the receiver 350, the transmitter 400, the receiver 450, or a transceiver comprising both the transmitter 400 and the receiver 450.

The optical communications device 800 comprises electrical input/output (I/O) circuitry 806 or electrical I/O means for receiving/sending electrical signals; OE and/or EO optical input/output (I/O) circuitry 808 or optical I/O means for receiving/sending optical signals; a processor 802 or processing means for processing received or sent data; and a memory 804 or data storage means for storing programs and data. The device 800 may also comprise RF components or RF I/O means coupled to the processor 802 for providing ingress or egress of RF signals.

The processor 802 is any combination of hardware, middleware, firmware, or software. The processor 802 comprises any combination of one or more CPU chips, cores, FPGAs, ASICs, or DSPs. The processor 802 communicates with the electrical I/O circuitry 806, the optical I/O circuitry 808, and the memory 804. The processor 802 comprises a component 810, which implements the disclosed embodiments. The inclusion of the component 810 therefore provides a substantial improvement to the functionality of the device 800 and effects a transformation of the device 800 to a different state. Alternatively, the memory 804 stores the component 810 as instructions, and the processor 802 executes those instructions.

The memory 804 comprises any combination of disks, tape drives, or solid-state drives. The optical communications device 800 may use the memory 804 as an over-flow data storage device to store programs when the device 800 selects those programs for execution and to store instructions and data that the device 800 reads during execution of those programs, for instance as a computer program product. The memory 804 may be volatile or non-volatile and may be any combination of ROM, RAM, TCAM, or SRAM. In some embodiments, the memory 804 can be memory that is integrated with the processor 802.

A computer program product may comprise computer-executable instructions stored on a non-transitory medium, for instance the memory 804, that when executed by a processor, for instance the processor 802, cause an apparatus to perform any of the embodiments.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An optical transmitter, comprising:
    a distribution matcher (DM) configured to receive information bits and to generate shaped symbols relating to the information bits;
    a pre-deinterleaver (PDI) coupled to the DM and configured to apply a perturbation function $q(n)$ to the shaped symbols to produce pre-deinterleaved symbols;
    an error reduction processor (ERP) coupled to the PDI and configured to receive computer instructions which, when executed, prompt the ERP to produce error reduction symbols from the pre-deinterleaved symbols, the error reduction symbols being perturbed from the pre-deinterleaved symbols by a perturbation function $p(n)$, wherein $p(n)$ represents perturbation resulting from both error reduction encoding and interleaving of the pre-deinterleaved symbols, wherein $q(n)$ is an exact mathematical inverse of $p(n)$; and
    a modulator coupled to the ERP and configured to convert the error reduction symbols into optical signals configured for transmission via an optical communication system.

2. The optical transmitter of claim 1, wherein the ERP comprises:
    a forward error correction (FEC) processor coupled to the PDI and configured to receive computer instructions which, when executed, prompt the FEC processor to produce FEC codewords from the pre-deinterleaved symbols; and
    an interleaver coupled to the FEC processor and configured to permute the FEC codewords to produce the error reduction symbols.

3. The optical transmitter of claim 1, further comprising a tributary distributor coupled to the ERP and configured to distribute the error reduction symbols to a plurality of tributaries that are sent to the modulator, wherein the DM produces a plurality of output blocks comprising the shaped symbols and each output block occupies simultaneous consecutive symbol slots in each of the tributaries.

4. The optical transmitter of claim 1, wherein the modulator is a Quadrature Amplitude Modulation (QAM) modulator.

5. The optical transmitter of claim 1, wherein the modulator is a multiplexing modulator configured to transmit a plurality of subcarriers.

6. The optical transmitter of claim 1, wherein the optical communication system comprises an optical fiber.

7. An optical receiver, comprising:
    a detector configured to convert optical signals received from an optical communication system into received error reduction symbols;
    a received error reduction processor (RERP) coupled to the detector and configured to receive computer instructions which, when executed, prompt the RERP to produce received pre-deinterleaved symbols from the received error reduction symbols;
    a post-interleaver (PI) coupled to the RERP and configured to apply a perturbation function $q'(n)$ to the received pre-deinterleaved symbols to produce received shaped symbols, where the received error reduction symbols are based on shaped symbols perturbed by a perturbation function $q(n)$ and the perturbation function $q'(n)$ is an exact mathematical inverse of the perturbation function $q(n)$; and
    an inverse distribution matcher (invDM) coupled to the PI and configured to generate received information bits from the received shaped symbols.

8. The optical receiver of claim 7, wherein the RERP comprises:
    a de-interleaver coupled to the detector and configured to produce received forward error correction (FEC) codewords from the received error reduction symbols; and
    an FEC decoder coupled to the de-interleaver and configured to produce the pre-deinterleaved symbols from the received FEC codewords.

9. The optical receiver of claim 7, wherein the detector is a Quadrature Amplitude Modulation (QAM) detector.

10. The optical receiver of claim 7, further comprising a multiplexing equalizer coupled to the detector and configured to generate a plurality of subcarrier signals.

11. The optical receiver of claim 7, wherein the optical communication system comprises an optical fiber.

12. A method for transmitting information bits via an optical communication system, the method comprising:
- generating by a distribution matcher (DM) shaped symbols relating to received information bits;
- applying a perturbation function q(n) to the shaped symbols to produce pre-deinterleaved symbols;
- producing error reduction symbols from the pre-deinterleaved symbols, the error reduction symbols being perturbed from the pre-deinterleaved symbols by a perturbation function p(n), wherein p(n) represents perturbation resulting from both error reduction encoding and interleaving of the pre-deinterleaved symbols, wherein q(n) is an exact mathematical inverse of p(n); and
- converting by a modulator the error reduction symbols into optical signals configured for transmission via the optical communication system.

13. The method of claim 12, wherein producing the error reduction symbols from the pre-deinterleaved symbols comprises:
- producing by a forward error correction (FEC) processor FEC codewords from the pre-deinterleaved symbols; and
- permuting by an interleaver the FEC codewords to produce the error reduction symbols.

14. The method of claim 12, wherein converting the error reduction symbols into the optical signals comprises converting the error reduction symbols into Quadrature Amplitude Modulation (QAM) optical signals.

15. The method of claim 12, wherein converting the error reduction symbols into the optical signals comprises multiplexing the error reduction symbols from a plurality of subcarriers.

16. The method of claim 12, wherein the optical signals are configured for transmission via optical fiber.

17. A method for receiving information bits via an optical communication system, the method comprising:
- converting by a detector optical signals received from the optical communication system into received error reduction symbols;
- producing received pre-deinterleaved symbols from the received error reduction symbols;
- applying a perturbation function q'(n) to the received pre-deinterleaved symbols to produce received shaped symbols, where the received error reduction symbols are based on shaped symbols perturbed by a perturbation function q(n) and the perturbation function q'(n) is an exact mathematical inverse of the perturbation function q(n); and
- generating by an inverse distribution matcher received information bits from the received shaped symbols.

18. The method of claim 17, wherein producing received pre-deinterleaved symbols from the received error reduction symbols comprises:
- producing by a de-interleaver received forward error correction (FEC) codewords from the received error reduction symbols; and
- producing by an FEC decoder the pre-deinterleaved symbols from the received FEC codewords.

19. The method of claim 17, wherein converting the optical signals received from the optical communication system into the received error reduction symbols comprises converting the optical signals from Quadrature Amplitude Modulation (QAM) optical signals into the received error reduction symbols.

20. The method of claim 17, wherein converting the optical signals received from the optical communication system into the received error reduction symbols comprises converting the optical signals into a plurality of subcarriers.

21. The method of claim 17, further comprising receiving the optical signals via an optical fiber.

* * * * *